United States Patent [19]

Brinkmann et al.

[11] Patent Number: 4,565,517

[45] Date of Patent: Jan. 21, 1986

[54] HYDRAULIC PRESS FOR PRESSING MATS OF PLASTIC MATERIAL REINFORCED WITH GLASS FIBERS

[75] Inventors: Dirk Brinkmann, Lünen-Niederaden; Wolfgang Muller, Dortmund; Walter Sauerwald, Dortmund; Klaus Schmidts, Dortmund; Dieter Therolf, Dortmund; Ulrich Weber, Dortmund, all of Fed. Rep. of Germany

[73] Assignee: Hoesch Aktiengesellschaft, Dortmund, Fed. Rep. of Germany

[21] Appl. No.: 695,390

[22] Filed: Jan. 28, 1985

[30] Foreign Application Priority Data

Jan. 28, 1984 [DE] Fed. Rep. of Germany ....... 3403006

[51] Int. Cl.[4] .......................... B29F 1/00; B29C 3/00

[52] U.S. Cl. .............................. 425/451.2; 425/451.9; 425/590; 425/585; 425/406

[58] Field of Search .................. 425/450.1, 451, 451.2, 425/451.9, 589, 590, 595, DIG. 222, DIG. 223, 406, 408, 410, 411, 412, 415, 78, 135, 149, 405 H, DIG. 221

[56] References Cited

U.S. PATENT DOCUMENTS

| | | | |
|---|---|---|---|
| 3,599,289 | 8/1971 | Girola | 425/451.2 X |
| 3,613,171 | 10/1971 | Hehl | 425/DIG. 223 |
| 3,687,590 | 8/1972 | Cyriax | 425/450.1 X |
| 3,830,613 | 8/1974 | Aoki | 425/450.1 X |
| 3,890,081 | 6/1975 | Grundmann | 425/450.1 |
| 4,029,457 | 6/1977 | Yamamoto | 425/451 |
| 4,174,199 | 11/1979 | Benninghams | 425/451 |

FOREIGN PATENT DOCUMENTS

| | | | |
|---|---|---|---|
| DAS1127069 | 4/1962 | Fed. Rep. of Germany | 425/DIG. 221 |
| 1166081 | 10/1969 | United Kingdom | 425/451.2 |

*Primary Examiner*—J. Howard Flint, Jr.

*Attorney, Agent, or Firm*—McCormick, Paulding & Huber

[57] ABSTRACT

An hydraulic press for pressing plastic mats reinforced with glass fibers into formed parts, which press has a stationary and a slidable cross-piece as well as a press drive which drive for driving the slidable cross-piece has at least one adjusting cylinder with a stroke length corresponding to the working range of the press and at least two couplable press cylinders of short stroke wherein for coupling each press cylinder to the slidable cross-piece a coupling rod and a clamping means is provided, the press being distinguished in that in order to better accomodate incorporation of the press drive into an existing press, each press cylinder has a hollow lifting body through which an associated coupling rod is guided, and for coupling the lifting body to the associated coupling rod a clamping device is included on the lifting body.

5 Claims, 7 Drawing Figures

HYDRAULIC PRESS FOR PRESSING MATS OF PLASTIC MATERIAL REINFORCED WITH GLASS FIBERS

The invention concerns an hydraulic press for pressing plastic mats reinforced with glass fibers into formed parts, with a fixed cross-piece and a slidable cross-piece as well as a press drive, which press drive for driving the slidable cross-piece includes at least one adjusting cylinder with a work stroke corresponding to the range of movement of the press and at least two couplable press cylinders of short stroke, a coupling rod and a clamping means being provided for coupling each press cylinder to the slidable cross-piece.

Two presses of the aforementioned type are described and illustrated in German Gebrauchsmuster application G 83 37 753.0.

For effecting the press stroke these two presses each have four press cylinders of which each has its piston rod rigidly connected to a coupling rod.

With this the coupling of each coupling rod to the slidable cross-piece is effected by a clamping means accomodated in the slidable cross-piece.

Such an advantageous press drive however is not well suited to being incorporated into an already existing press.

The object of the invention is to provide a press of the foregoing type whose press drive is better suited for addition to an existing press.

In accordance with the invention this problem is solved by having each press cylinder include a hollow lifting body through which the connecting rod is guided, and by causing the coupling of the lifting body to the coupling rod to be achieved by a clamping device arranged on the lifting body.

Preferably each clamping device contains a clamping sleeve actuated by a pressure medium.

Each lifting body is formed with several longitudinal slots in the clamping area of the clamping sleeve.

Also, in a refinement of the invention each clamping device can be made with several ring clamping elements.

Such ring clamping elements of each clamping device are preferably arranged between two annular pistons actuated by a pressure medium.

In the following the invention is described in more detail in connection with the drawings which schematically illustrate two embodiments of the invention.

The drawings are:

FIRST EMBODIMENT

Figure 1:
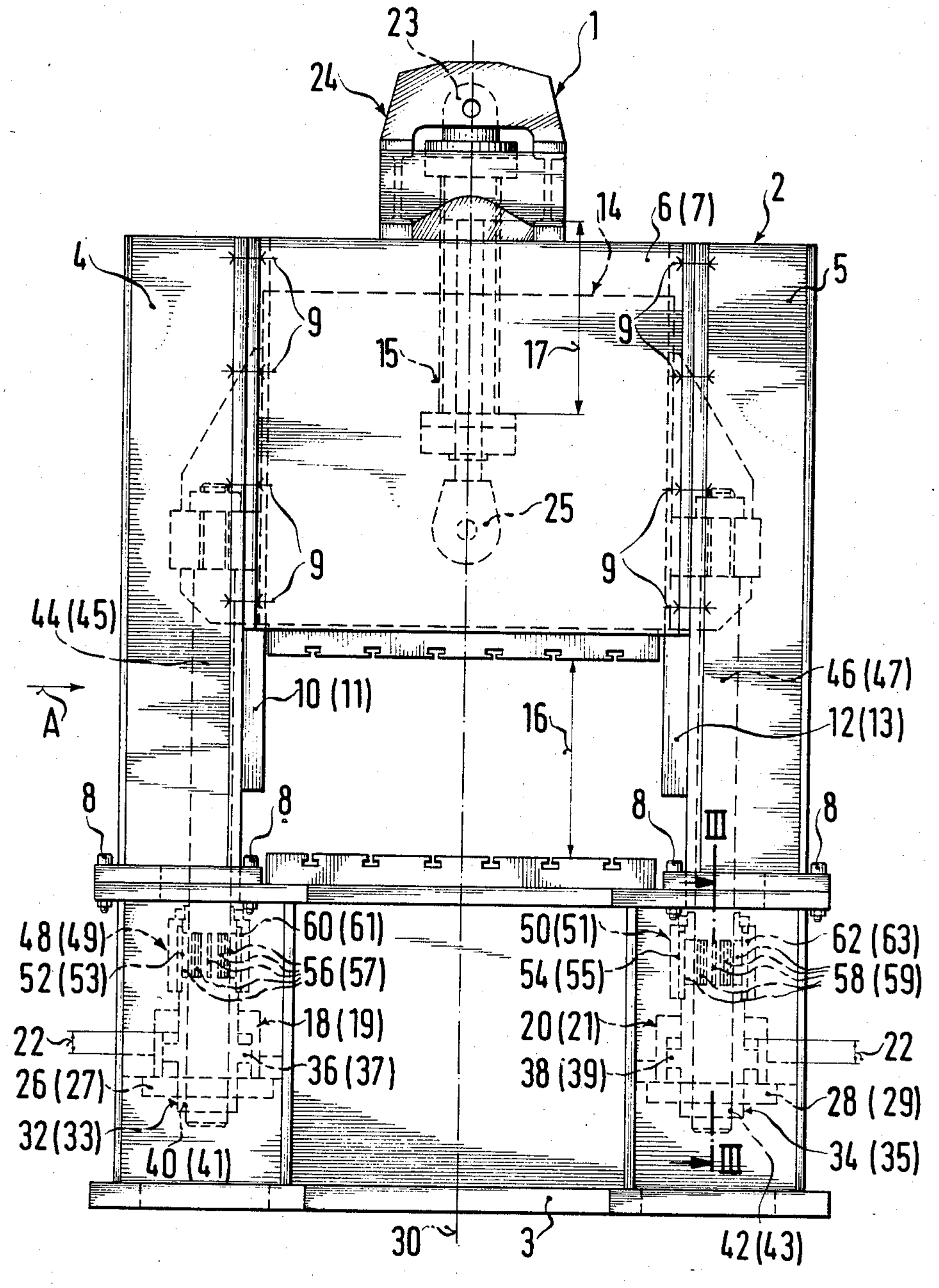
FIG. 1 is a front view of a hydraulic press comprising a first embodiment of the invention.
Figure 2:
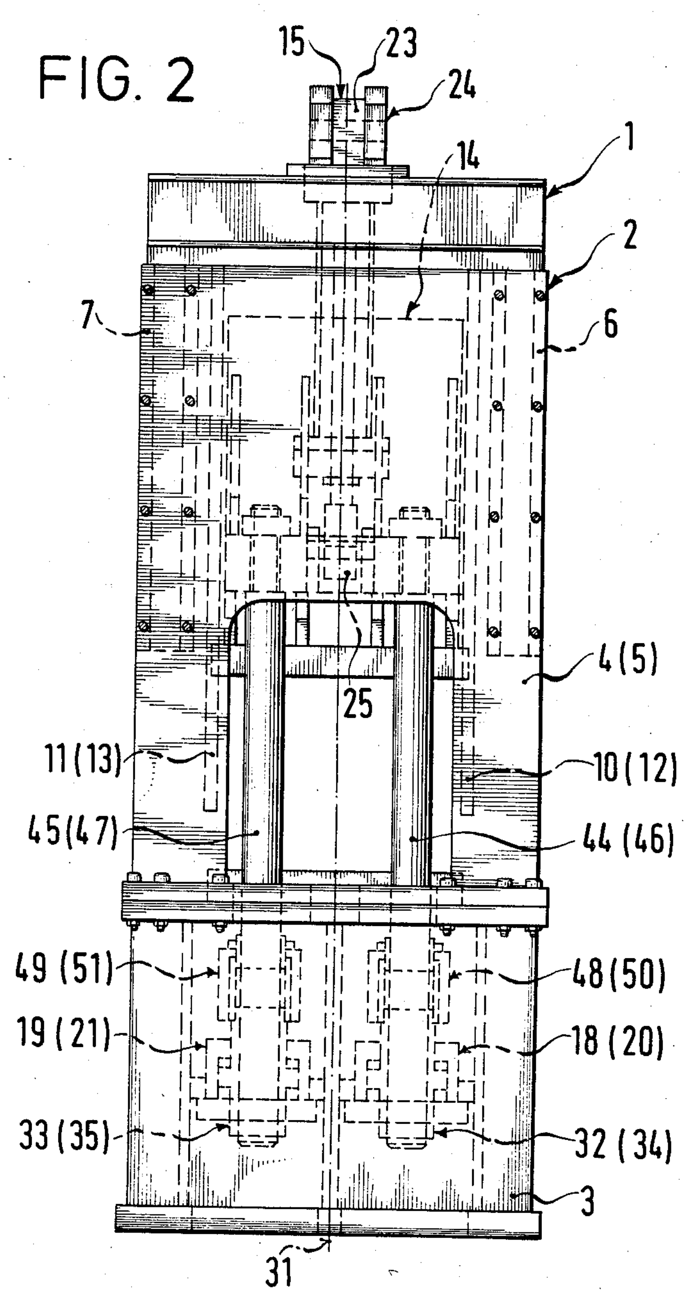
FIG. 2 is a side view of the press of FIG. 1 taken in the direction of the arrow A of FIG. 1.

An hydraulic press 1 includes a press frame 2 with a stationary cross-piece 3, two side parts 4, 5 and two cross-bars 6, 7. Screws 8, 9 connect the side parts 4, 5 with the stationary cross-piece 3 and with the cross-bar 6, 7.

The two side parts 4, 5 each have two vertical guides 10, 11, 12, 13 for guiding a slidable cross-piece 14.

For driving the slidable cross-piece 14 an adjusting cylinder 15 having a stroke length 17 corresponding to the working range 16 of the press 1 and four press cylinders 18, 19, 20, 21 of short stoke 22 are used.

The adjusting cylinder 15 is pivotably hung at its upper end from a support 24 resting on the cross-bars 6, 7. Its lower end 15 is pivotably connected to the slidable cross-piece 14.

Each press cylinder 18, 19, 20, 21 has a housing flange 26, 27, 28, 29 which is rigidly connected with the stationary cross-piece 3.

The arrangement of the press cylinders 18, 19, 20, 21 is symmetrical to the middle 30, 31 of the press.

Each press cylinder 18, 19, 20, 21 has a hollow lifting body 32, 33, 34, 35 with a piston 36, 37, 38, 39 and a cylindrical through bore 40, 41, 42, 43.

Guided through each lifting body 32, 33, 34, 35 is a coupling rod 44, 45, 46, 47 of round cross-section connected to the slidable cross-piece 14.

On each lifting body 32, 33, 34, 35 is an hydraulic clamping device 48, 49, 50, 51 having a clamping sleeve 52, 53, 54, 55.

In the middle of the clamping area of the clamping sleeves 52, 53, 54, 55 all lifting bodies 32, 33, 34, 35 are provided each with eight longitudinal slots 56, 57, 58, 59.

The coupling of the lifting bodies 32, 33, 34, 35 to the coupling rods 44, 45, 46, 47 is achieved by the application of pressurized oil to the annular spaces 60, 61, 62, 63.

Figure 3:
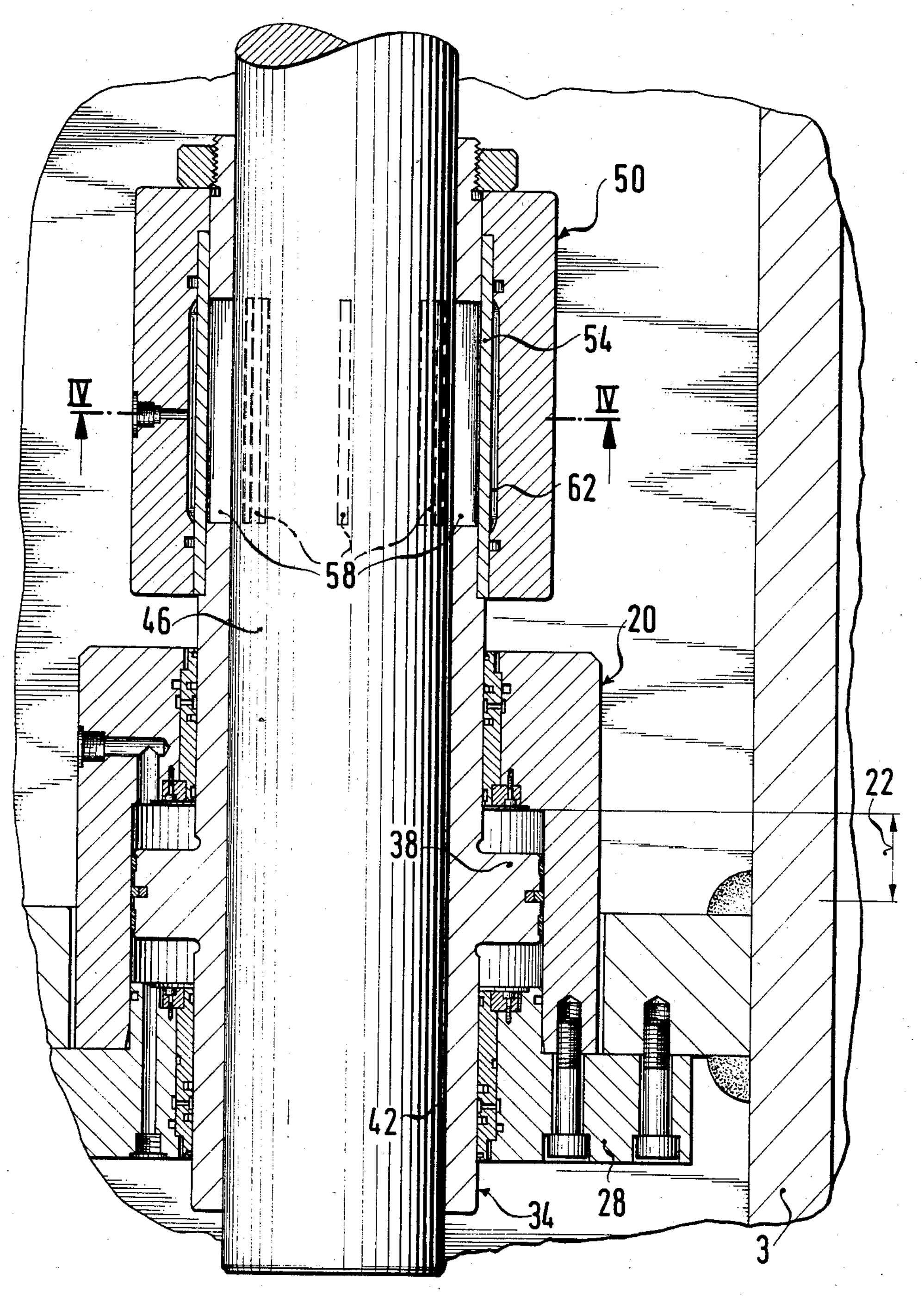
FIG. 3 is a partial sectional view in enlarged scale taken through the press along the line III—III of FIG. 1.
Figure 4:
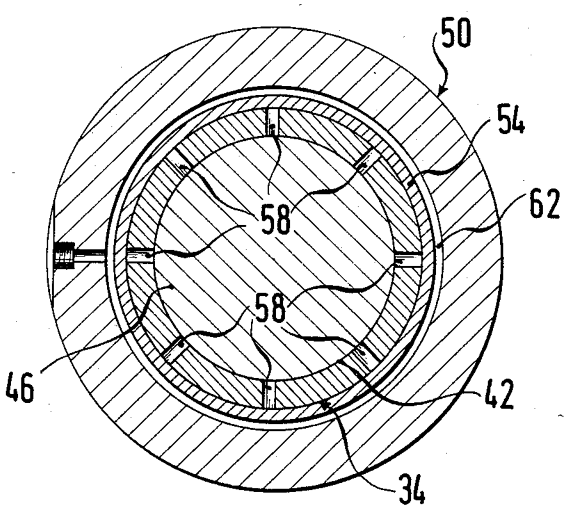
FIG. 4 is a sectional view taken on the line IV—IV of FIG. 3.
Figure 5:
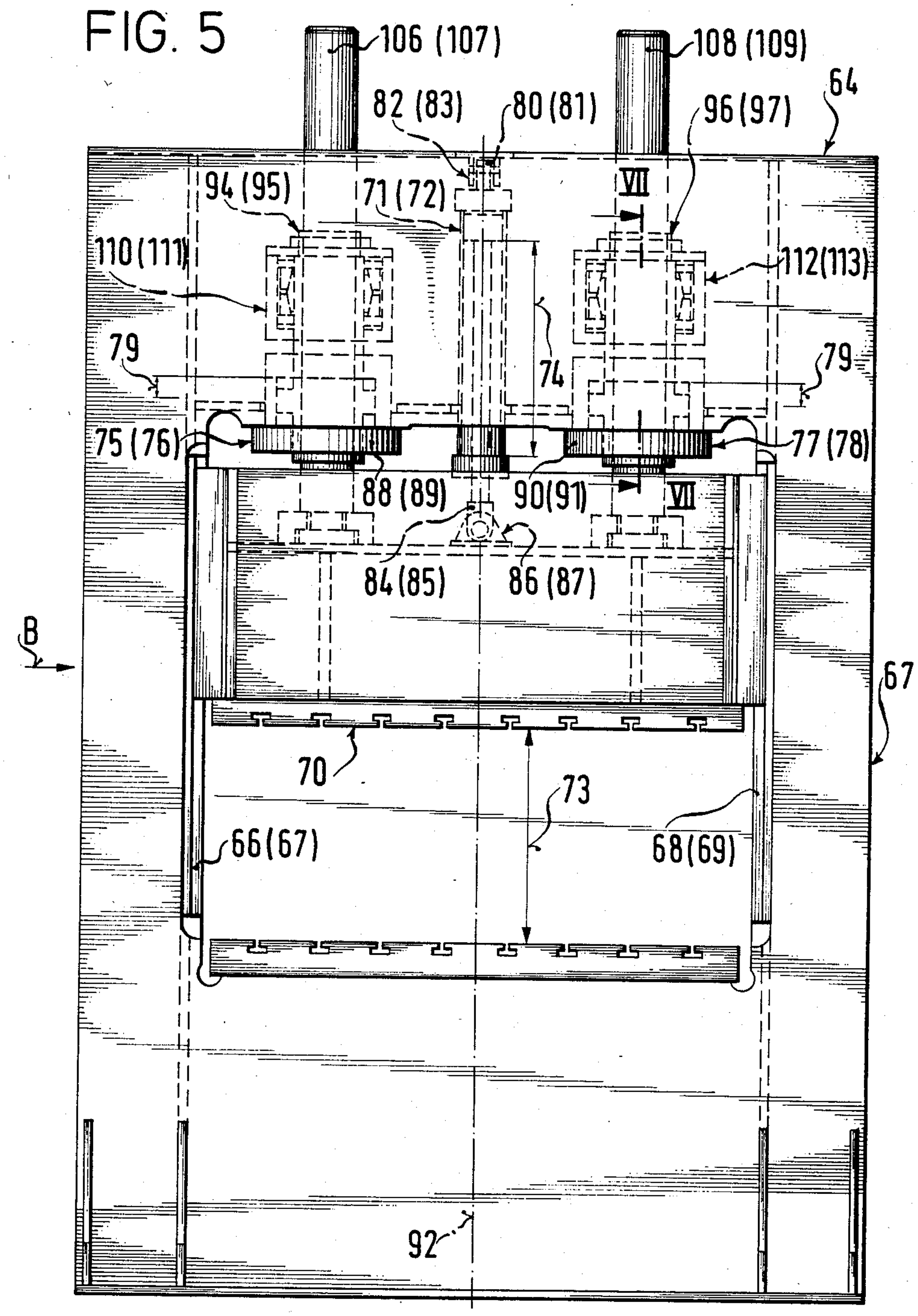
FIG. 5 is a front view of an hydraulic press comprising a second embodiment of the invention.

In doing so, in accordance with FIG. 3, the clamping sleeve 54 clamps the lifting body 34 to the coupling rod 46, essentially in the region of the longitudinal slots 58.

SECOND EMBODIMENT

Figure 6:
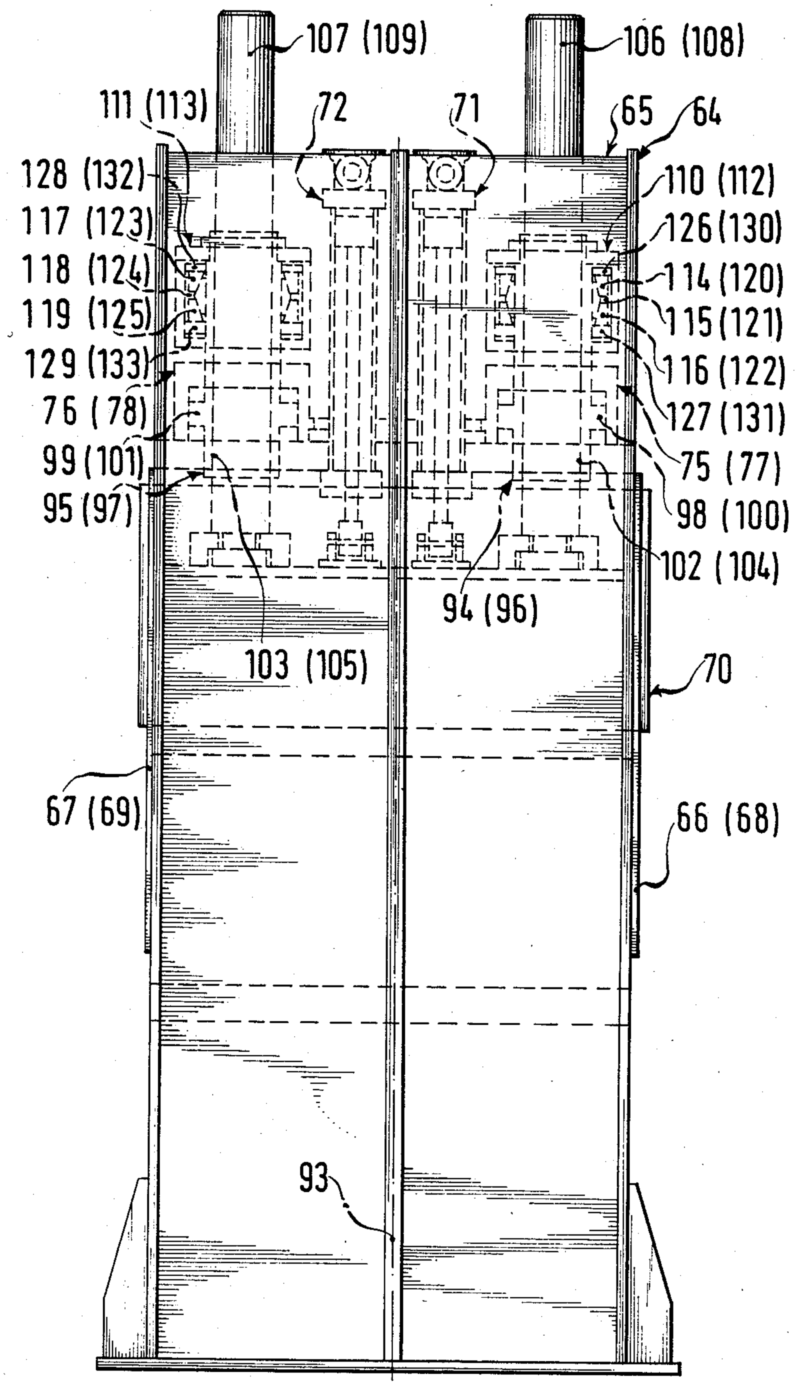
FIG. 6 is a side view of the press taken in the direction of the arrow B of FIG. 5.

An hydraulic press 64 according to FIG. 6 includes a press frame 65 having four vertical guides 66, 67, 68, 69 for guiding a slidable cross-piece 70.

For driving the slidable cross-piece 70 two adjusting cylinders 71, 72 with stroke lengths 74 corresponding to the working range 73 of the press 64 and four press cylinders 75, 76, 77, 78 of short stroke 79 are used.

Each adjusting cylinder 71, 72 is hung pivotably at its upper end 80, 81 from a support 82, 83 connected with the press frame 65. The lower end 84, 85 of each adjusting cylinder 71, 72 is pivotably connected to the slidable cross-piece 70 through a bearing 86, 87.

Each press cylinder 75, 76, 77, 78 has a housing flange 88, 89, 90, 91 rigidly connected with the press frame 65.

The arrangement of the adjusting cylinders 71, 72 and the press cylinders 75, 76, 77, 78 is symmetrical to the middle 92, 93 of the press.

Each press cylinder 75, 76, 77, 78 has a hollow lifting body 94, 95, 96, 97 with a piston 98, 99, 100, 101 and a cylindrical through bore 102, 102, 104, 105.

Guided through each lifting body 94, 95, 96, 97 is a coupling rod 106, 107, 108, 109 connected to the slidable cross-piece 70.

On each lifting body 94, 95, 96, 97 is a clamping device 110, 111, 112, 113 with three clamping ring elements 114, 115, 116, 117, 118, 119, 120, 121, 122, 123, 124, 125.

The ring clamping elements 114 to 125 of each clamping device 110, 111, 112, 113 are arranged between tow annular pistons 126, 127, 128, 129, 130, 131, 132, 133.

Figure 7:
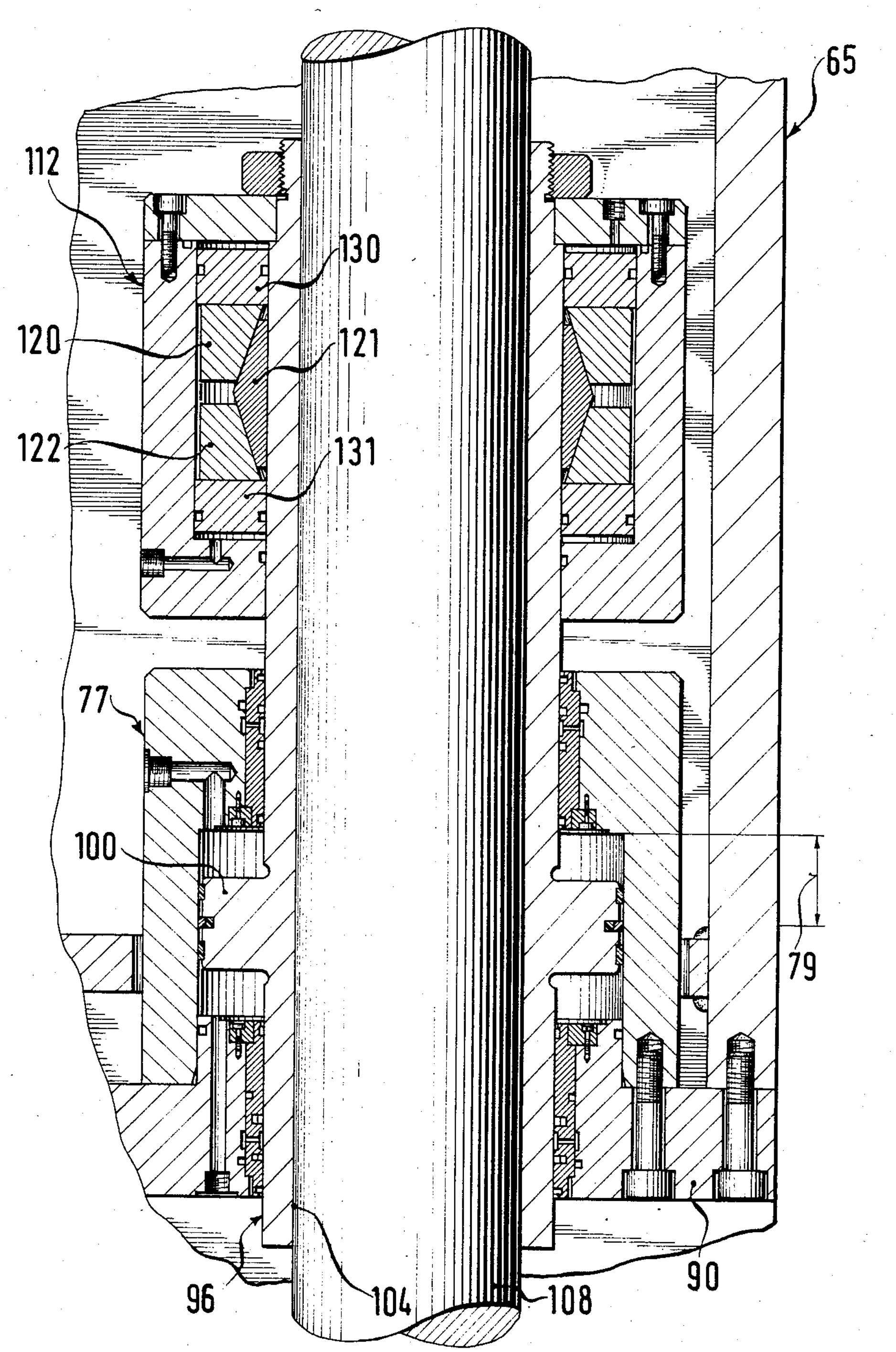
FIG. 7 is a partial section view in enlarged scale taken through the press on the line VII—VII of FIG. 5.

The coupling of the lifting bodies 94, 95, 96, 97 to the coupling rods 106, 107, 108, 109 is achieved by applying pressurized oil to the annular pistons 126 to 133. In this way as evident from FIG. 7, by movement of the ring clamping elements 120, 122 toward one another the lifting body 96 is clamped and coupled to the coupling rod 108 essentially in the area of the ring clamping element 121. Thus by then applying pressurized oil to the piston 100 the cross-piece 70 can be moved within the range of the short stroke 79.

We claim:

1. An hydraulic press for pressing plastic material into formed parts, said press comprising a stationary and a movable cross-piece as well as a press drive, said press drive for driving the movable cross-piece into and out of working relationship relative to said stationary cross-piece including at least one adjusting cylinder with a stroke length corresponding to the working range of the press and at least two couplable press cylinders of short stroke and a coupling means for coupling each of said press cylinders to said slidable cross-piece, each of which coupling means includes a coupling rod and a clamping device, each of said press cylinders having a first part fixed relative to said stationary cross-piece and a hollow lifting body movable relative to said first part and to said stationary cross-piece and through which hollow lifting body the coupling rod of the associated one of said coupling means is slidably guided, the clamping device of said associated coupling means being arranged on the lifting body for coupling the lifting body to its coupling rod.

2. An hydraulic press according to claim 1, further characterized in that each clamping device has a clamping sleeve actuatable by a pressure medium.

3. An hydraulic press according to clam 2 further characterized in that each lifting body within a clamping area of the clamping sleeve is formed with several longitudinal slots.

4. An hydraulic press according to claim 1 further characterized in that each clamping device is made with several ring clamping elements.

5. An hydraulic press according to claim 4 further characterized in that the ring clamping elements of each clamping device are arranged between two annular pistons operable by a pressure medium.

* * * * *